United States Patent [19]
Baron et al.

[11] Patent Number: 6,139,903
[45] Date of Patent: Oct. 31, 2000

[54] METHOD OF COMPENSATING FOR NON-LINEAR CHARACTERISTICS IN DISPENSING A COATING MATERIAL

[75] Inventors: Carl N. Baron, Mayfield Heights; Stephen L. Merkel, Bay Village; Robert C. Hall, Strongsville, all of Ohio

[73] Assignee: Nordson Corporation, Westlake, Ohio

[21] Appl. No.: 07/951,308

[22] Filed: Sep. 24, 1992

Related U.S. Application Data

[60] Continuation of application No. 07/791,151, Nov. 13, 1991, abandoned, which is a division of application No. 07/367,388, Jun. 16, 1989, Pat. No. 5,065,695.

[51] Int. Cl.[7] .................................................. B05D 3/14
[52] U.S. Cl. ........................................................ 427/8
[58] Field of Search .............................. 427/8; 118/688, 118/692; 222/55

[56] References Cited

U.S. PATENT DOCUMENTS

| | | | |
|---|---|---|---|
| 1,647,273 | 11/1927 | Clayton-Kennedy . | |
| 1,881,826 | 10/1932 | McQuade . | |
| 3,862,414 | 1/1975 | Algeri | 250/206 |
| 3,901,266 | 8/1975 | Guy | 137/219 |
| 3,924,840 | 12/1975 | Nelson, Jr. | 259/191 |
| 4,013,037 | 3/1977 | Warning, Sr. et al. | 118/2 |
| 4,060,649 | 11/1977 | Coleman | 427/79 |
| 4,075,976 | 2/1978 | Clayton | 118/324 |
| 4,122,036 | 10/1978 | Lewis | 252/421 |
| 4,166,246 | 8/1979 | Matt | 328/5 |
| 4,183,726 | 1/1980 | Seebald | 432/13 |
| 4,249,478 | 2/1981 | Gruener | 118/668 |
| 4,315,317 | 2/1982 | Orchard et al. | 364/510 |
| 4,330,354 | 5/1982 | Deubner et al. | 118/688 |
| 4,357,900 | 11/1982 | Bushor | 118/681 |
| 4,358,947 | 11/1982 | Greene et al. | 73/3 |
| 4,361,333 | 11/1982 | Firth | 277/12 |
| 4,367,075 | 1/1983 | Hartwig | 48/89 |
| 4,374,704 | 2/1983 | Young | 202/117 |
| 4,380,967 | 4/1983 | Matt | 118/667 |
| 4,431,690 | 2/1984 | Matt et al. | 427/424 |
| 4,433,237 | 2/1984 | Matt | 250/222.1 |
| 4,493,286 | 1/1985 | Carson | 118/677 |
| 4,500,937 | 2/1985 | Matt | 361/153 |
| 4,557,787 | 12/1985 | Mansfield et al. | 156/356 |
| 4,561,380 | 12/1985 | Mulder et al. | 118/688 |
| 4,562,088 | 12/1985 | Navarro | 118/692 |
| 4,613,059 | 9/1986 | Merkel | 222/52 |
| 4,636,401 | 1/1987 | Yamazaki et al. | 427/39 |
| 4,645,133 | 2/1987 | Hagiwara et al. | 241/182 |
| 4,720,801 | 1/1988 | Boll | 118/696 |
| 4,797,301 | 1/1989 | Ardley et al. | 427/8 |
| 4,822,647 | 4/1989 | Nozaki et al. | 427/421 |
| 4,828,218 | 5/1989 | Medlock | 251/26 |
| 4,829,793 | 5/1989 | Holder et al. | 118/315 |
| 4,833,748 | 5/1989 | Zimmer et al. | 118/692 |
| 4,872,954 | 10/1989 | Hogan | 202/105 |
| 4,879,662 | 11/1989 | Vicari et al. | 364/510 |
| 4,922,852 | 5/1990 | Price | 118/692 |
| 5,054,650 | 10/1991 | Price | 222/1 |

FOREIGN PATENT DOCUMENTS

| | | | |
|---|---|---|---|
| 0166092 | 4/1985 | European Pat. Off. | B05B 12/00 |
| 2116720 | 8/1983 | United Kingdom | G01F 25/00 |
| 2162770 | 2/1986 | United Kingdom | B05C 11/10 |
| 8700267 | 1/1987 | WIPO | G01L 25/00 |

*Primary Examiner*—Benjamin Utech
*Attorney, Agent, or Firm*—Wood, Herron & Evans L.L.P.

[57] ABSTRACT

A method of controlling and operating a fluid dispensing apparatus is provided which modifies a tool speed signal from a robot and generates a corrected signal to a dispenser nozzle flow controller to compensate for non-linear flow characteristics of fluids, such as non-Newtonian adhesive fluids, to maintain uniform bead size as the tool speed varies. The corrected tool speed signal is generated by computing the ideal flow for the tool speed, comparing the computed flow with actual flow data stored in memory using linear interpolation of data between the stored values, and generating a control signal modified in accordance with the comparison. The stored data is acquired by operation of the apparatus in a calibration mode wherein a series of standard signals is sent to the fluid controller while the actual flow at each signal level is measured and stored in a table. The method corrects for non-linear flow phenomena such as that known as the shear-thinning effect that is flow rate dependent.

15 Claims, 4 Drawing Sheets

| SAMPLE (N) | $S_N$ (VOLTS) STD. SIGNAL added to zero signal | $F'_N$ (COUNT) ACTUAL FLOW | $F_N$ (CALCULATED LINEAR) IDEAL FLOW |
|---|---|---|---|
| 0 | 0 | 0 | 0 |
| 1 | 0.5 | 0 | 223 |
| 2 | 1.0 | 0 | 446 |
| 3 | 1.5 | 51 | 669 |
| 4 | 2.0 | 223 | 892 |
| 5 | 3.0 | 804 | 1338 |
| 6 | 4.0 | 1457 | 1784 |
| 7 | 5.0 | 2074 | 2230 |
| 8 | 6.0 | 2663 | 2676 |
| 9 | 7.0 | 3309 | 3122 |
| 10 | 8.0 | 3621 | 3568 |
| 11 | 9.0 | 4014 | 4014 |
| 12 | 1.0 | 4022 | * SATURATED |

METHOD OF COMPENSATING FOR NON-LINEAR CHARACTERISTICS IN DISPENSING A COATING MATERIAL

This application is a continuation of application Ser. No. 07/791,151, filed Nov. 13, 1991, abandoned.

This is a division, of application Ser. No. 07/367,388, filed Jun. 16, 1989, now U.S. Pat. No. 5,065,695.

The present invention relates to the control of material flow in a fluid dispensing process and, more particularly, to a method and apparatus for calibrating correction factors to control the deposition rate of a fluid coating material having non-uniform flow characteristics when discharged at a varying discharge rate, now U.S. Pat. No. 5,065,695.

BACKGROUND OF THE INVENTION

The automated deposition of coating materials, such as adhesives, onto the surfaces of work-pieces is commonly performed through the use of program controlled devices such as robot mounted discharge guns. The devices which support the guns are programmed to move the guns in such a way in relation to the workpiece surface so as scribe a predetermined deposition pattern onto a series of articles or workpieces. In such devices, a robot control program establishes the tool speed while a gun nozzle control attempts to control a volume discharge rate which will maintain the bead width of the coating material at a constant or other predetermined thickness as the tool speed in relation to the surface of the workpiece varies. The tool speed is a term defined in the art of robotics as the linear or scaler speed at which the point of application of coating material to the workpiece moves across the workpiece surface. The tool speed is most often established by controlling the motion of the discharge gun through the articulation of a robot arm on which the gun is mounted. The volume rate of the discharge of the coating material is established by the pressure of the fluid in the gun and nozzle opening of the discharge gun.

The tool speed may in some applications be controlled for the most part to remain uniform, but even in such applications, the tool speed will nonetheless necessarily change at certain portions of the coating path, particularly where changes in the direction of the tool occur. When the tool speed changes, unless a compensating variation is made in the volume discharge rate of the coating material from the nozzle, the linear deposition of material will be non-uniform. A uniform deposition, or bead size, is usually an important objective to be achieved in the coating process. This is particularly true in the case of adhesives deposited on a substrate or work-piece.

For example, in the application of elastic seals to door panels, such as the doors of refrigerators and automobiles, a closed irregular path is scribed by the nozzle of an adhesive discharge gun along the surface of a door panel as it is moved past the robot on an assembly line. The robot scribes the loop at a speed which changes at corners and along curved portions of the path. To maintain a constant bead size, which is a goal in the adhesive application process, the aperture of the gun nozzle is often programmed to vary at least in inverse proportion to the tool speed. Due to the nature of the materials of which the adhesive are made, however, such control of the bead size has been less than satisfactory for maintaining a constant bead size in that the flow of the material has tended to be, under such circumstances, non-linear.

Due to the nature of their applications, coating materials are often developed with special flow properties. In the case of adhesives, for example, it is desirable that the material, once applied to the workpiece surface, remain in place and not flow under the influence of gravity or otherwise until the part to be glued is in place. Such an adhesive material must, however, be flowable from the nozzle and onto the workpiece surface so that it can be rapidly and accurately applied during the adhesive application process. As a result, these fluids have an initial resistance to flow at low pressures, but as they begin to flow under the influence of the pressure imposed on the material at the gun that resistance declines and they thereupon flow more freely.

The characteristic of a fluid which is non-flowable when deposited on a workpiece but which becomes increasingly more flowable the more rapidly it is ejected through a nozzle is known as shear thinning, the thinning effect caused by the internal shearing stress produced in the fluid passing through the nozzle. Materials possessing this shear-thinning property, unfortunately, do not thin only as they begin to flow, but do so in differing degrees depending on the rate of at which they are discharged through a nozzle. Even more unfortunately, many factors such as nozzle configuration, material composition, temperature and other factors, not all of which are controllable or predictable, influence the degree to which shear-thinning will occur. Furthermore, it is not only these specially developed adhesives, but many other dispensed fluid materials which possess this property to some degree. In addition, due to this cause and for other reasons, many fluids are not ideal, possessing non-linear, or non-Newtonian flow characteristics which may cause their resistance to flow to either increase or decrease as the forces which move them change.

Heretofore, there has not been an effective or adequate apparatus or method to compensate for the shear thinning effects and other non-linear flow characteristics of materials during a controlled deposition process. Accordingly, there exists a need to provide a solution to the problem of the non-linear relationship between flowability of dispensed materials and volume flow rates and other fluid dispensing parameters.

SUMMARY OF THE INVENTION

It is a primary objective of the present invention to provide a method and apparatus which will compensate for the non-linear flow characteristics of a coating material in a programmed or controlled deposition process. It is a more particular objective of the present invention to provide for the calibration of a program controlled coating discharge apparatus to compensate for the non-linear flowability of a material, and especially for the shear thinning of a material, deposited from a discharge nozzle programmed to control the bead size of a coating material, such as an adhesive, deposited with variable tool speed device on a workpiece.

In accordance with the principles of the present invention there is provided a method and apparatus by which the actual flow rate of a coating material is measured in relation to a variable control parameter such as tool speed. The measured flow values are stored along with the parameter data and the ideal or linear flow rate of the material is calculated. A stored calibration table or algorithm is then used during the coating process to correct for the non-linear flow characteristics of the material by substituting the actual control parameter with a substitute value which will produce the flow rate of an ideal fluid.

In accordance with the preferred embodiment of the present invention, there is provided a control for a programmed, robot mounted coating discharge nozzle which operates the dispensing device in a calibration mode to measure the actual flow volume of coating material in response to a plurality of standardized control signals, each for a specified operating time interval. The measurement data is stored in table corresponding to the respective standard signal values in the form of a table or algorithm for use during the dispensing process in correction of the tool speed signals from the robot in such a way as to be effective to modify the signals to produce the intended flow rate in lieu of the measured rate. During the operating mode when the fluid is dispensed onto actual workpieces, the modified signals are communicated in lieu of the preprogrammed signals to the nozzle control of the fluid dispensing gun to control the gun nozzle to deliver the intended flow of coating material onto the workpiece.

More specifically, during the calibration mode, a series of signal levels or voltages representing signals corresponding to the tool speed of the robot gun are delivered to the gun nozzle control and the coating flow is measured for a predetermined time interval, and a measurement representing the actual material delivered by the nozzle during the interval is stored, along with the sample tool speed signal value. A correction table is then calculated. During operation mode, when a signal representing the actual tool speed is received by the controller, the ideal flow is calculated. Then, the table is read and, through linear interpolation, a corrected tool speed signal is calculated to replace the actual tool speed signal which would produce an actual flow rate equal to the calculated ideal flow rate. Preferably, this is achieved by a linear interpolation made from the data stored in the table during calibration. This corrected signal is fed to the gun in lieu of the actual tool speed signal to produce a flow which, in relation to the actual tool speed signal, is an ideal or controlled flow.

In addition, in accordance with further objections of the present invention, in the preferred embodiment of the invention, the total material deposited on each part is measured from part to part and the flow control parameters are changed as each new workpiece is begun to compensate for changes in material viscosity. Automated zeroing of the gun is also provided.

The invention provides for a more uniform bead size and linear deposition rate of coating material, improved economy of material, and improved quality of the coated product.

These and other objects and advantages of the present invention will be more readily apparent from the following detailed description of the drawings in which:

DETAILED DESCRIPTION OF THE PREFERRED EMBODIMENT

Figure 1:
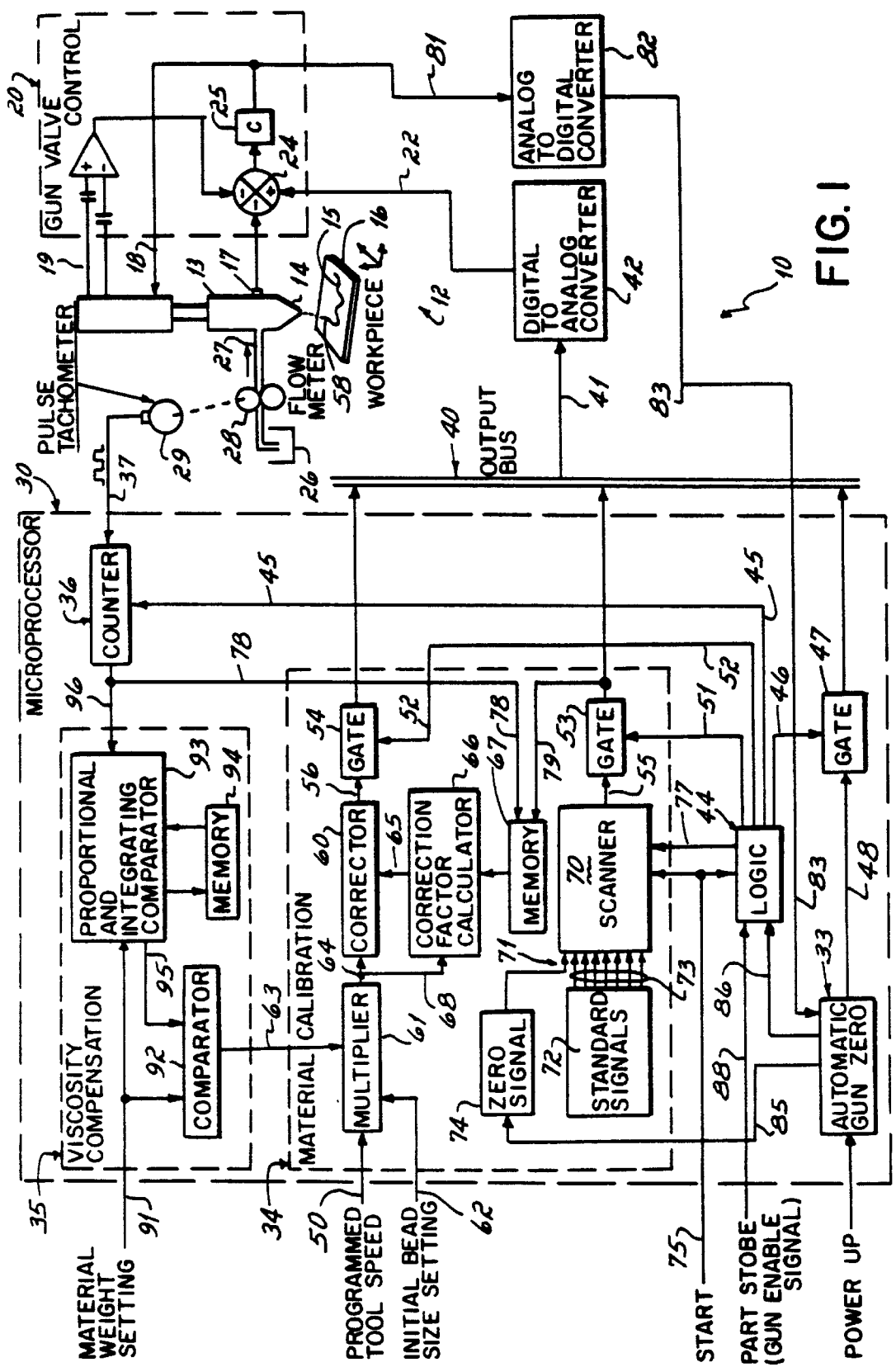
FIG. 1 is a functional block diagram of a preferred embodiment of a fluid dispensing system embodying principles of the present invention.

Referring to FIG. 1, a functional block diagram illustrating a method and apparatus for compensating for the non-linear flow characteristics of a coating material is illustrated embodied in an adhesive dispensing system 10. The control portion of the system 10 is shown in combination with a fluid material dispensing apparatus 12 such as that disclosed in the commonly assigned and copending U.S. patent application Ser. No. 07/164,536, filed Mar. 7, 1988 for "An Apparatus and Method for Dispensing Fluid Materials Using Position-Dependent Velocity Feedback", now U.S. Pat. No. 4,842,162 expressly incorporated herein by reference. The discharge device 12 may alternately or in addition include the features described in the commonly assigned and copending U.S. patent application Ser. No. 07/243,238, filed Sep. 7, 1988 and entitled "Apparatus for Dispensing Fluid Materials" now U.S. Pat. No. 4,922,852. The devices described in the incorporated patent applications are particularly useful for dispensing non-Newtonian fluid adhesive material from a robot supported fluid dispensing gun 13 through a flow regulating nozzle 14 in a programmed pattern of fluid 15 onto a workpiece 16.

In the specific apparatus described in application Ser. No. 243,238, the flow of the dispensed fluid is sensed by a pressure transducer 17 disposed to sense the pressure drop across the nozzle 14. The transducer 17 generates a feedback signal which is applied through a closed loop control to an electropneumatic servo valve which operates a double acting air cylinder to meter the valve and control the pressure drop across the nozzle to control the flow of the dispensed fluid in accordance with a driving signal. In a robot carried gun, the driving signal is correlated to the relative speed between the workpiece 16 and the nozzle 14 to proportionately control the amount of fluid per unit length contained in the bead of fluid 15 deposited on the surface of the workpiece 16. The drive signal is applied through a control line 18.

U.S. patent application Ser. No. 164,536 in part specifically describes a gun in which a valve stem feedback signal is correlated to both the relative velocity and the position of the nozzle valve stem with respect to the nozzle seat. The additional feedback signal is provided on lines 19 and communicated to the valve control 20 to increase the gain of the feedback signal when the valve is near the closed position to render the control more stable and sensitive for precise control of the valve.

The gun valve control 20 receives the signals from the lines 17 and 19 and sums them, with an analog signal of opposite polarity on line 22, through a summing junction 24. A difference signal is thereby generated and applied through a compensation network 25 to the gun servo control input 18. The signal line 22 communicates to the gun valve control 20 a program control signal for controlling the flow rate of the material 15 from the nozzle 14 of the gun 13. This material is supplied from a fluid supply reservoir 26 through an input line 27 connected to the gun 13. A gear type flowmeter 28 connected in line 27 drives a pulse tachometer 29 to produce a digital output signal in the form of a total pulse count proportional to the actual flow of the material 15 through line 27 to the gun 13 during a given time interval.

The system 10 includes a control circuit module 30 which, in accordance with the preferred embodiment of the present invention, is a microprocessor programmed to perform the functions herein described. The preferred embodiment utilizes a Motorola 68000 series microprocessor. To better facilitate understanding of the operation of the control circuit 30, its configuration is functionally described in the context of the embodiment illustrated in FIG. 1 with the functional components shown as structurally distinct circuits which may be defined by hardware, software or firmware.

The circuit 30 includes an automatic gun zeroing circuit 33, a material calibration circuit 34 and the viscosity compensation circuit 35. In addition, included in the control circuit 30 is a flow pulse counter 36 which has an input line 37 connected from the output of the pulse tachometer 29 to communicate pulses to the counter 36 of a rate proportional to the actual flow of the material 15 through the line 27 to the gun 13.

A digital data output bus 40 receives digital data output from the material calibration circuit 34 and the automatic gun zero circuit 33 and directs the data onto a digital output line 41 through a digital-to-analog converter 42 onto the flow control analog signal line 22 from which the data from line 41, in analog form, is communicated to the gun valve control 20 to control the nozzle 14 and thus the flow discharge rate of the material 15 from the gun 13.

Additional logic circuitry represented by logic module 44 is contained within the circuit 30 to control certain functions of the automatic gun zero circuit 33, the material calibration circuit 34, the viscosity compensation circuit 35 and the counter 36. The logic circuit 44 includes an output 45 connected to a reset input of the counter 36 to clear and reset the contents of the counter 36 to zero. The logic circuit 44 also is provided with a plurality of outputs for selectively gating output data onto the output bus 40. These gating outputs include output 46 connected to a gate or digital switch circuit 47 to gate the digital output from line 48 onto the output bus 40 to provide a signal to the gun valve control 20 for controlling the setting of the nozzle 14 during the gun zeroing function of the control circuit 30. This zero signal, once delivered, will offset the actual tool speed signal from the robot which is received by the circuit 30 at input 50.

The logic circuit 44 also includes a pair of digital outputs 51 and 52 for controlling similar gate circuits 53 and 54, respectively for controlling data from a pair of outputs 55 and 56 from the material calibration circuit 34 onto the output bus 40. The data gated through the gate 53 from the output line 55 of the material calibration circuit 34 provides a signal to the gun valve control 20 to control the nozzle 14 and the dispensing rate of the material 15 during execution of the material calibration function of the circuit 30. The signal from the output 56 gated through the circuit 54 onto the bus 40 provides the normal operating signal to the gun valve control 20 for regulating the nozzle 14 of the gun 13 to control the rate of dispensation of the fluid 15 onto workpieces 16 during the regular operating cycle of the system 10.

In the normal mode of operation of the fluid dispensing device 12, control circuit 30 functions to accept a signal 50 which is proportional to the tool speed to generate an output control signal onto the output bus 40 which is effective to control the nozzle 14 to provide a controlled and generally constant linear rate of discharge of the material 14 onto a workpiece 16. The tool speed signal on line 50 is a signal received from the robot which carries the gun 13 and which is programmed to control, and thereby determine, the tool speed of the gun 13. The term "tool speed" in the context of devices such as those described in connection with the system 10 refers to the scaler representation of the motion of a point 58 on the workpiece 16 at which the material 15 initially contacts the surface of the workpiece 16 as it is dispensed from the nozzle 14 of the gun 13. Generally, this may be considered to be the intersection of the axis of the nozzle 15 with the surface of the workpiece 16. Given the dynamics of certain applications, however, certain corrections would be made to such an assumption, however, that is not important to the description of the present invention.

Figures 2, 3:
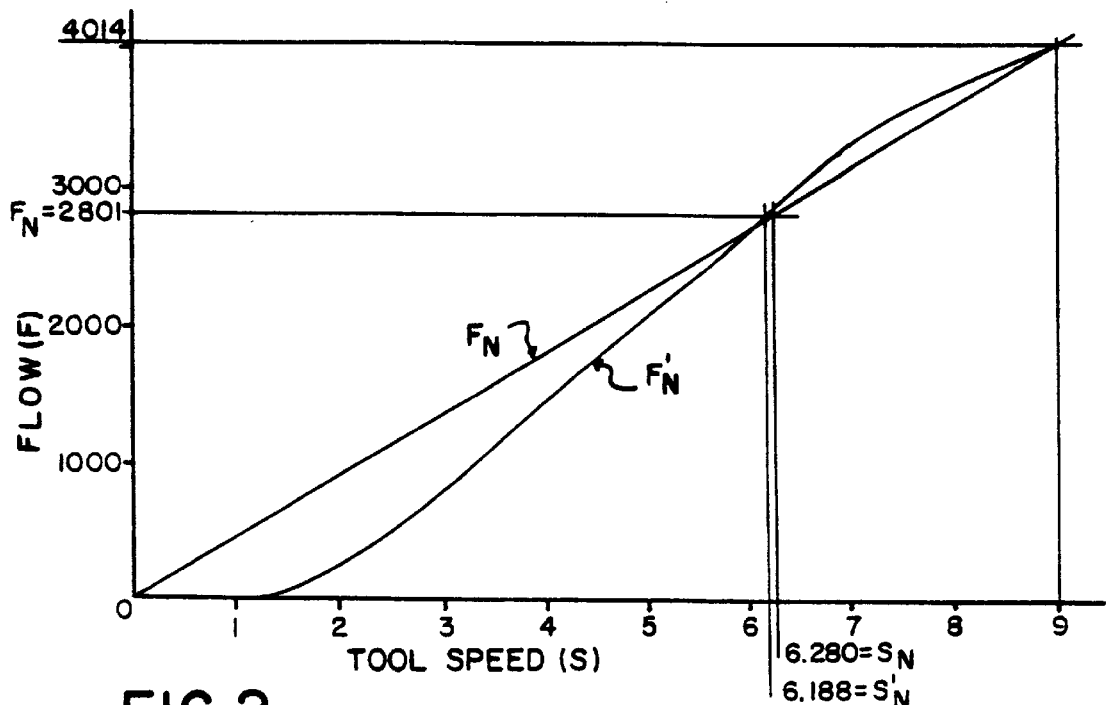
FIG. 2 is a graph illustrating typical flow characteristics for an ideal fluid and a non-Newtonian fluid.
FIG. 3 is a sample correction table for material characteristics calibration in accordance with a preferred embodiment of the present invention.

The intended function of the control circuit 30 is the processing of the tool speed signal from input line 50 onto the output bus 40 so as to provide a signal which will cause a flow of material from the nozzle 14 onto the workpiece 16 to be linearly proportional to the tool speed signal received at the input 50. This ideal or desired flow is represented by the curve at $F_N$ in the graph of FIG. 2. The graph of FIG. 2 plots the flow (along the vertical axis) in relation to the magnitude of a scaled tool speed signal $S_N$ (along the horizontal axis). While the flow $F_N$ represents the ideal or linear flow expected or desired from the fluid as a function of the scaled tool speed signal $S_N$, in reality, for non-Newtonian fluids which the dispensed adhesive material 15 typically is, the actual flow will more likely correspond to the curve $F'_N$ in FIG. 2 or some other non-linear curve representative of the flow characteristics of the fluid through the specific hardware device such as the gun 13 of the fluid dispensing apparatus 12. Accordingly, in the preferred embodiment of the present invention, a corrector 60 is connected in series between the programmed tool speed signal input 50 and the output 56 to adjust the signal applied to the output bus 40 in such a way that the actual curve corresponds to the desired curve $F_N$ of FIG. 2.

Referring more particularly to FIG. 1, the program tool speed input from the robot 50 is connected through a multiplier 61 to the input of the corrector 60. The multiplier 61 scales the tool speed signal from the input 50 in accordance with a predetermined setting of the initial bead size at input 62 and the output 63 from the viscosity compensation network 35, both of which are connected as inputs to the multiplier 61. This produces a signal at the output 64 of the multiplier 61 which, if uncorrected by the corrector 60, will be communicated to the output 56 of the calibration circuit 34 through the gate 54 and onto the output bus 40.

The corrector 60 functions to shape the signal from the multiplier output 64, preferably by its replacement with a corrected signal from the output 65 of a correction factor calculator circuit 66. The corrected signal is applied to the output 56 of the corrector 60 and will, when communicated to the gun valve control 20, produce the flow $F_N$ (FIG. 2) which represents the flow desired when the scaled tool speed signal at the input 64 to the corrector 60 is at the level $S_N$.

In order to apply the correct correction factor, the calculator 66 retrieves from a memory 67 data relating to the flow properties of the fluid 15. This data is, for example, as illustrated in the Table of FIG. 3. The data stored in the memory 67 is, as FIG. 3 illustrates, a table of sampled flow data from, for example, approximately 12 measured points. The data table stored in the memory 67 stores, for each one of the sampled points numbered 0 to 11, for example, includes a set of values of a voltage $S_N$ representing the magnitude of the shaped tool speed signal at lead 64 connected from the output of the multiplier 61. Corresponding to each of these data points is a value representing the actual flow of material 15 from the nozzle 14 stored in terms of the pulse count produced at the output 37 of the pulse tachometer 29 over some arbitrary fixed time interval measured during calibration. This count is that which results when the voltage $S_N$ is applied directly to the output bus 40 and then in analog form to the input 22 of the gun valve control 20.

Table in FIG. 3 also shows the ideal linear material flow $F_N$ in the form of a theoretical or calculated flow count which corresponds to each of the representative signals $S_N$ in the table of FIG. 3 for an ideal fluid. The correction factor calculator 66 functions to read the signal $S_N$ at its input 68 from the multiplier output 64 and to calculate, using a direct linear interpolation method from the data in the table (FIG. 3) stored in the memory 67, the value of the output signal $S_N'$ to be applied at output 56 in order to produce the ideal flow $F_N$ for the value $S_N$ at the input 68.

Sample calculation performed by the correction factor calculator 66 is as follows: Assuming that the scaled tool speed signal $S_N$ at input 68 of the calculator 66 is, for example, a value of 6.280 volts, the column of the table of FIG. 3 labeled $S_N$ is scanned in the memory, the values in the column are compared with the signal at input 68, and a determination is made of the table entries between which the signal $S_N$ falls. For the data illustrated, $S_N$ falls between samples of N=8 and N=9. The ideal or desired flow value $F_N$ for a signal of 6.280 volts equals (4014/9)×6.28, or a count of 2801. By a direct linear interpolation method, the calculator 66 will determine that the value $S'_N$ needed to produce a flow count of 2801 equals 6+((2801−2663)/(3309−2663)) or 6+(138/746) which equals 6.188 volts. Accordingly, the value of 6.188 volts is sent to the input 65 to the corrector 60 to replace the 6.28 volt actual scaled tool speed input signal $S_N$ with the value of $S'_N$ of 6.188 volts. This value, when gated to the output bus 40 through the gate 54 will pass through the digital line 41 and through the digital-to-analog converter 42 where it is converted to an analog signal which is, in turn, transmitted over the line 22 to the input of the gun valve control 20. The control 20 will then cause a signal to be produced on line 18 to the gun 13 to operate the nozzle 14 to produce the flow $F_N$ which will produce a count of 2801 at the pulse tachometer 29 for the standard predetermined time interval.

The generation of the correction factor table stored in memory 67 is achieved by a calibration mode function of the material calibration circuit 34. This function is performed by circuitry which includes a scanner 70 having an output 55 connected through the gate 53 to the output bus 40 and having inputs 71 representing standard tool speed signals (shown as $S_N$ in the table of FIG. 3) spanning the range scaled tool speed signal values which would be expected to appear during operation at the input 64 to the corrector 60. The standard signals $S_N$ are stored in a non-volatile memory device 72, each value represented by an output 73 connected to the input 71 of the scanner 70. A volatile memory register 74 is provided to store the zero reference signal determined by the automatic zero circuit 33. The value in register 74 represents that signal which, when gated through the gate 53 onto the output bus 40, will bring the nozzle 14 to its zero setting. The zero signal value is stored into register 74 after being computed by the automatic gun zero circuit 33 upon the power-up of the system 10.

Receipt of an input signal at the input 75 causes the output 55 of the scanner 70 to be gated through gate 53 to the bus 40 in the same manner, but in lieu of, the output 56 from the corrector 60 which would be gated through the gate 54 during normal operation. This calibration function is performed only when the gun 13 is directed into a bucket or other material collecting receptacle rather than onto workpieces 16 for a calibration operation. The directing of the gun is controlled by the robot controller, and not the circuit 30. However, the communication of a signal to the circuit 34 verifying the gun is in a proper calibration position is a preferred feature.

The operation of the calibration function is carried out with the scanner 70 sequentially switching the successive outputs 73 of the standard signal register 72 to sequentially impose standard signals onto the bus 40 and to deliver the signals sequentially to the gun valve control 20 to operate the nozzle 14 of the gun 13. Generally, the standard signals must exceed the zero signal in order for flow to occur. These signals may be selected by adding predetermined signal values to the content of the zero register. As each one of the inputs 71 is sequentially connected by the scanner to its output 55, the counter 36 is reset by a signal imposed on the reset line 45, synchronized by the logic circuit 44 to correspond to the scanner trigger signal generated by the logic circuit 44 onto the scanner trigger input 77. Each of the standard signals from lines 71 is applied by the scanner 70 for the same predetermined amount of time during which pulses from the pulse tachometer 29 are received on line 37 by the counter 36. Thus, the counter 36 will sequentially record a count proportional to the actual flow $F'_N$ (FIG. 3). When the predetermined time interval has ended and a flow measurement is completed by the counter 36, the count is stored in the memory 67 through the line 78 from the output of the counter 36. The flow value $F_N$ is stored in a memory location corresponding to a location at which the value of the standard signal $S_N$, transmitted along line 79 from the output of the gate 53, is stored in the memory 67. The locations correspond to respective values of N.

These values are stored as the scanner sequentially sweeps from the zero signal level sequentially to the next higher standard signal level until a value of the actual flow $F_N$ is measured by the counter 36 which is equal to or not significantly higher than the previously recorded value. That condition is indicative of the saturation point of the nozzle 14 of the gun 13 and, accordingly, is ignored as being out of the operating range of the ability of the gun 13 to proportionately respond to the input control signal on the line 22. When a gun saturation level is detected, the last recorded signal then is taken as the maximum flow rate available from the gun 13, as shown in the table of FIG. 3 where this value occurs with a 9 volt signal level for $F_N$. This maximum value of $S_N$ is used to determine the ideal linear relationship between flow and tool speed needed to calculate the ideal value of $F_N$ for each of the standard signal values for the table which will be stored in the memory 67.

The standard zero signal level stored in register 74 is recalculated upon the powering up of the device 10 by the auto zero circuit 33. The gun 13 of the preferred embodiment is driven by double acting cylinder with a signal at its servo input 18. The input signal at input 18 is generated at one polarity, for example of a positive polarity, to open the nozzle 14, and is generated at the opposite polarity, for example a negative polarity, to drive the nozzle closed. The closing of the nozzle is done via signal which urges the nozzle toward its closed condition. The signal is present to hold the nozzle in its closed condition during an idle condition between dispensing phases. The automatic zero circuit 33 functions to find the amount of offset that is required to neutralize the signal at the servo input 18 to the gun 13, a signal which will be detected by a zero signal value on line 81. The line 81 is a feedback line connected from the gun valve control 20 through an analog to digital converter 82 to a feedback input 83 of the automatic gun zero circuit 33. This signal is directly proportional to the signal on servo input 18 of the gun 13.

The automatic zero circuit 33 functions to sequentially step a voltage from zero to successively higher values until the feedback signal on line 83 reaches zero. When that occurs, the value of the signal so generated is stored as the zero standard signal in register 74 through the line 85. Line 85 is an output of the circuit 33 which is connected to the input of the zero signal register 74 of the material calibration circuit 34. The stepped signal which is generated during the search for the automatic zero setting by the circuit 33 is applied to the zeroing circuit output 48 through the gate 47 onto the output bus 40 through the digital-to-analog converter 42 and onto the analog signal line 22 to apply the signals through the summing junction 24 and to the servo inlet 18 of the gun 13. Upon powering up of the circuit, the logic circuit 44 will gate open the gate 47 and close the gates 53 and 54 from the material calibration circuit 34. When auto zero is completed, the signal on the line 86 causes the logic circuit to enable the reconnection of the material calibration circuit 34 to the bus 40.

The material calibration circuit 34 functions to respond to changes in the flow characteristics of the material 15 due to changes in the tool speed as the point 58 moves across the workpiece 16. More slowly varying changes in the flow characteristics of the fluid 15 are brought about by changes in material viscosity caused by temperature fluctuations, by changes in the characteristics of material as the level of the supply changes in the reservoir 26, or as material on different batches is added to the supply in the reservoir 26. Such changes in the viscosity are controlled by the viscosity compensation network 35 which delivers a compensating signal on its output 63 to the multiplier 61 of the calibration circuit 34.

Viscosity compensation is carried out during the operational mode of the system 10 wherein control signals are applied through the gate 54 onto the bus 40 during the actual application of the material 15 to workpieces 16. During this phase, the counter 36 is used to measure the entire amount of material 15 deposited onto a given workpiece 16. When each new workpiece 16 is brought into position for a coating application to begin, a PART STROBE or GUN ENABLE signal is received from the robot device on an input line 88 of the logic circuit 44 to cause a generation of a reset signal on line 45 to reset the counter 36 to zero. Thereupon, the pulses from the line 37 from the pulse tachometer 29 record the total flow of material onto the workpiece 16.

The counter 36 is, preferably, at least a 12 bit register designed to store at least a 12 bit binary representation of the count on line 37 for each measurement to be taken by the material calibration circuit during the calibration mode or during the operational mode. A number representative of the desired amount of material to be deposited on a given workpiece is input as a material weight setting at entry line 91 to the viscosity compensation network 35. This material weight setting value is communicated from the input 91 to a comparator circuit 92 and also to a proportional and integrating comparator circuit 93. A memory 94 is also provided to store the values output from a counter 36.

The viscosity compensation circuit 35 functions so as to compare the measured flow onto each of the workpieces 16 and to compare that value with the material weight setting at input 91. The comparison generates a signal at output 95 from the comparator 93 to the comparator 92 in order to apply a viscosity compensation signal to the output 63 for communication to the multiplier 61 of the circuit 34 to scale the tool speed signal produced at the input 64 to the corrector 60. As the output from the comparator 63 is generated, the initial bead size setting 62 is progressively overridden as the viscosity compensation network takes control of the bead size with the material weight setting at inlet 91 being the dominant setting for control of the actual bead size on the workpiece.

The compensation algorithm performed by the viscosity compensation network 35 is selected so as to cause convergence upon the desired value in a rapid, reliable and stable manner. This is achieved by using a compensation factor which includes both proportional term and an integral term. The proportional term is selected to be ½ the difference between the measured weight setting value in inlet 91, in the preferred embodiment, and the actual measured value from the counter 36 at its output 96. The integral term is set equal to the proportional term less the previous integral term. The compensation factor is set to equal the sum of the actual value from the counter 96 plus the integral term. As such, the actual value will converge to the set value in a manner illustrated by the following example where the actual value is, for example, initially measured at 200 g where the set value which is desired is 100 g. The convergence is illustrated by the table as follows:

| RUN NO. | SET VALUE | ACTUAL VALUE | PROP TERM | INTEG TERM |
| --- | --- | --- | --- | --- |
| 1 | 100 | 200 | −50 | −50 |
| 2 | 100 | 150 | −25 | −75 |
| 3 | 100 | 125 | −13 | −88 |
| 4 | 100 | 112 | −6 | −94 |
| 5 | 100 | 106 | −3 | −97 |
| 6 | 100 | 103 | −2 | −99 |
| 7 | 100 | 101 | −1 | −100 |
| 8 | 100 | 100 | 0 | −100 |
| 9 | 100 | 100 | 0 | −100 |
| 10 | 100 | 100 | 0 | −100 |

Figure 4:
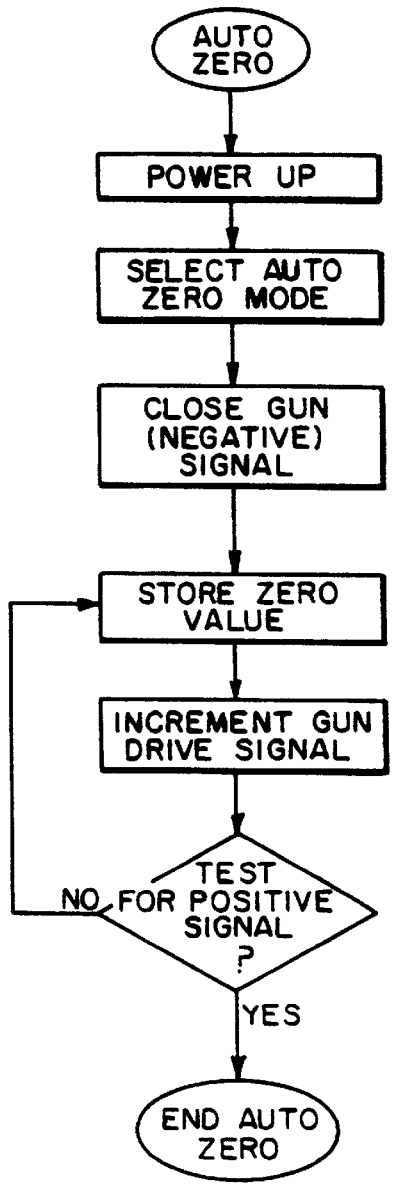
FIGS. 4–6 are flowcharts showing the control sequence of one embodiment of the system of FIG. 1.
Figure 5:
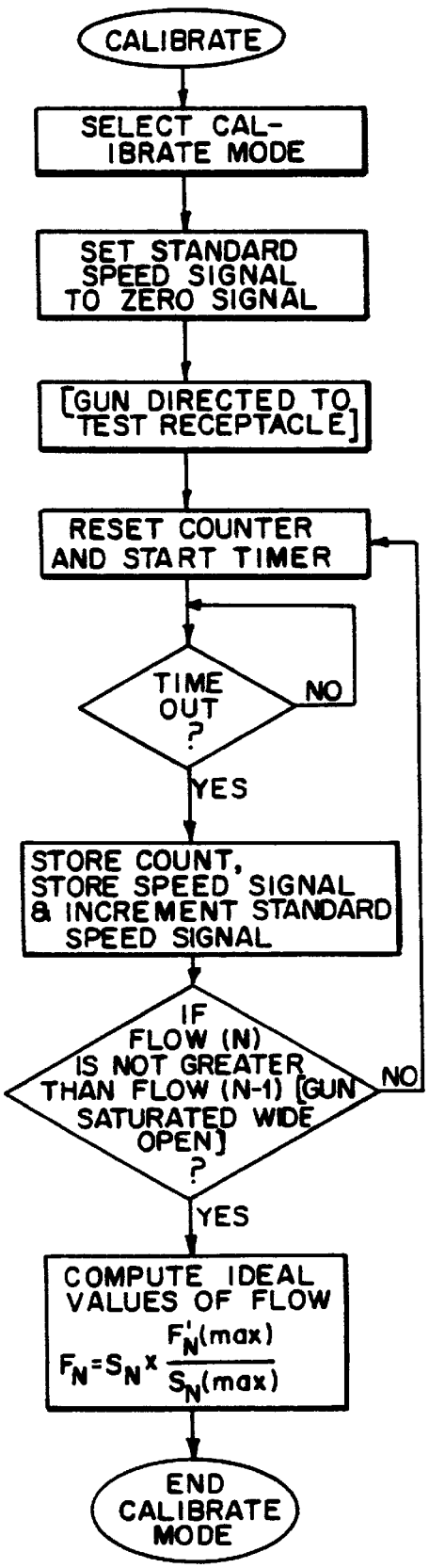
Figure 6:
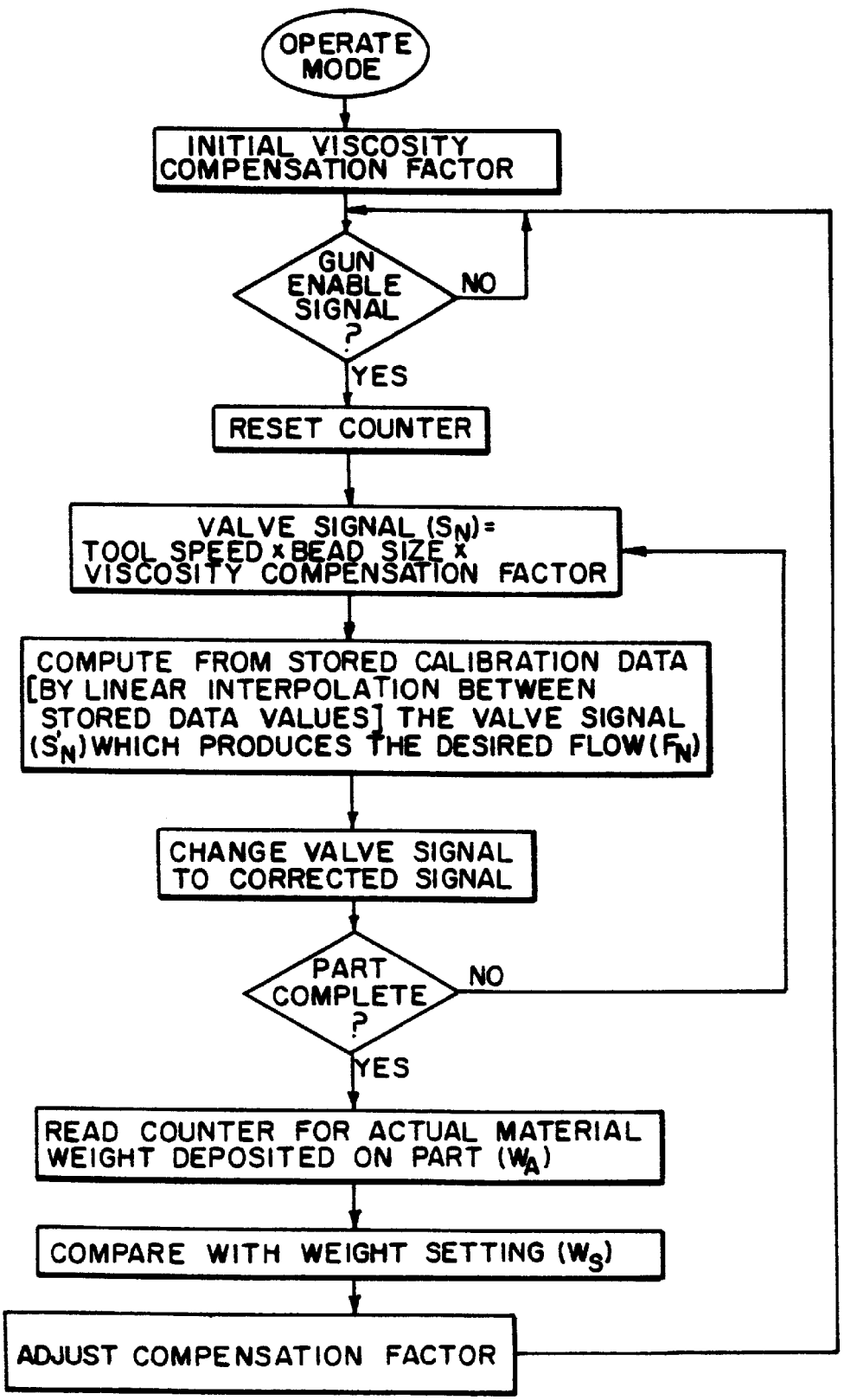

The operation of the system 10 is shown by the flowcharts of FIGS. 4–6. Referring to FIG. 4, upon the powering up of the system, the automatic zero circuit 33 is initiated as the logic circuit 44 selectively connects only the zero circuit 33 through gate 47 to the output bus 40 thereby selecting the automatic zero mode. At this point, the closed gun negative signal is imposed on the servo input line 18 of the gun 13 causing the gun 13 to be activated to the position which urges closed the nozzle 14. At this point, a voltage value which is initially set at zero in a register within the automatic gun zero circuit 33 is then transmitted along line 85 and stored in the zero signal register 74. The gun drive signal of zero is at this time being output from the circuit 33 through the output 48 and gate 47 onto the output bus 40 and thus to the gun valve control circuit 20. Thereupon, the auto zero circuit 33 increments the signal a fractional amount causing a slight positive signal to be output to the line 48 through gate 47 to the output bus 40. This signal adds to the negative signal being delivered to the servo input 18 of the gun 13 by control 20 causing a slight increase in the negative feedback signal to line 81, converter 82, and line 83 to the circuit 33. This signal is tested, and if negative, the value of the output signal 48 is again transmitted through line 85 and stored in register 74 as represented by the loop to the store zero value box in the flowchart of FIG. 4. This incrementing process continues as this loop is reexecuted until the value output onto the bus 40 by the auto zero circuit is sufficient to cancel the negative signal applied to the gun 18 as will be sensed by the signal on feedback line 83 going positive as will be sensed by the auto zero circuit 33. When this happens, the last stored zero value in register 74 thus provides the zero setting and the auto zero routine ends, the gate 47 disconnects and the gates 51 is energized as the calibration circuit assumes control for the operating mode.

Calibration of the material calibration circuit 34 is carried out in accordance with the process illustrated in the flowchart portion of FIG. 5. As the calibration routine is initiated, the calibration mode is selected by the energizing of the gate 53 through line 51 from the logic circuit 44 to impose the output of the scanner 55 onto the bus 40. This is done along with the setting of the scanner to its initial position which imposes the output of the zero signal register 74 through line 71 onto the output 55. During the calibration mode, the logic circuit then resets the counter 36. Thereupon, the gun 13, which will have been directed into a test receptacle, will proceed to dispense material 15 for a predetermined standardized time interval during which the acts will flow through the gun 13 as measured by the flowmeter 28 which outputs pulses from the tachometer 29 to the counter 36. The flow continues until the time interval is terminated whereupon the count is stored along the output line 78 into the memory 67 along with the standardized signal value $S_N$ along line 79 to the memory 67. Then, the logic circuit 44 sends a triggering pulse along line 77 to the scanner 70 to shift to the next value of standard signal from the register 72 to impose that value through output line 55 onto the bus 40 which causes the nozzle 14 of the gun 13 to open further and thereupon deliver a different value to the counter 36.

The counter 36 will have been reset in synchronism with the triggering pulse 77 to the scanner 70. Thus, the value read by the counter 36 will be representative of the value measured during the time increment at which the next standard signal is delivered to the bus 40. This routine is reexecuted until saturation of the gun 13 is detected whereupon the table illustrated in FIG. 3 will have been completed and stored in the memory 67, thereby completing the material calibration.

When the calibration is completed, the endpoint of the value of the flow count for the last standard tool speed signal setting allows for determination of the proportional ideal linear flow values for each of the previously measured actual flow values $F_N'$. Accordingly, the last column of the table shown in FIG. 3, $F'_N$, is thereupon calculated. Then, the calibration has been completed and the logic circuit 44 deactivates the gate 53 and opens the gate 54 for normal operation.

During normal operating mode, a part strobe indication or gun enable signal will be received along line 88 to the logic circuit 44. When this occurs, the logic circuit 44 generates a signal on line 45 to reset the counter 36. The tool speed signal from the robot along input line 50 is then scaled in accordance with the initial bead size setting on input 62 and the viscosity compensation factor on line 63 from the viscosity compensation network 35 to produce a tool speed scale signal at the input 64 to the corrector 60. The correction factor is then computed in a manner described above by a linear interpolation after finding the interval at which the value on line 64 falls into the table shown in FIG. 3. Accordingly, from the stored calibration data the scaled tool speed signal value S' which produces the desired flow $F'_N$ is computed. The signal on 64 is then changed to the corrected signal computed and provided along line 65 to the corrector 60 and imposed on the output 56 through the gate 54 to the output bus 40. As such, the correct signal will be delivered to the gun 13.

During this time, the material flowing onto the part 16 is being measured and a count proportional to the measurement is being accumulated in the counter 36. This continues until a part 16 is complete with the changing tool speed values at input 50 constantly being corrected through the corrector 60 in accordance with the correction factor in table 66 in accordance with the algorithm explained above. When the part has been complete, the gun closes and the count in register 36 terminates. Thereupon, the viscosity compensation circuit 35 proceeds to compute the actual weight of the dispensed material onto the workpiece 16, to compare that weight with the setting at input line 91, and to set compensation factor equal to the proportion of the desired weight to the actual weight. This factor will further scale the tool speed at input line 50 for the next part through the multiplier 61 to produce a viscosity compensated signal at input 64 which remains constant throughout the coating of the next workpiece. After the compensation factor is updated, control returns to the logic circuit 44 to await a part strobe signal indicating that the next workpiece is ready to be coated.

At any time during the utilization of the system 10, the material calibration mode may be manually selected by the manual activation of a signal at the input line 75. This will be coupled with the decision to direct the nozzle into a receptacle so that a test can be run without depositing fluid onto workpieces. The calibration circuit 34 may be manufactured in such a way that the memory 67 is non-volatile so that calibration need not be performed at each powering up of the equipment. Where, however, material properties may vary during the course of a machine run, it may be desirable to perform more than one calibration operation during each powering up of the system 10.

Having described the invention, what is claimed is the following:

1. A method of maintaining a controlled relationship between a variable input signal and the actual dispensing rate of a fluid having a non-linear characteristic of flow from a dispensing device, the method comprising the steps of:
    dispensing fluid from the device onto a workpiece by:
        (1) receiving an input signal;
        (2) modifying the received input signal as a function of a measurement of a first flow of the fluid from the device to produce a compensated signal;
        (3) correcting the compensated signal with stored correction data to generate a corrected compensated signal to produce the actual dispensing rate having the controlled relationship to the received input signal; and
        (4) operating the, dispensing device in response to the control signal to dispense a second flow of fluid onto the workpiece in the controlled relationship to the received, input signal.

2. The method of claim 1 further comprising the steps of:
    before dispensing the fluid, generating a correction data table by:
    generating a series of discrete input calibrating signals spaced in value over the expected range of the variable input signal;
    in response to each input calibrating signal, storing in the table correction data correlating the actual dispensing rate with the input calibrating signal.

3. The method of claim 2 wherein the data storing step includes the steps of:
    for each input calibrating signal:
        (i) generating a calibration control signal proportional to the input calibrating signal,
        (ii) dispensing the fluid in response to the calibration control signal,
        (iii) measuring the actual dispensing rate of the fluid dispensed in substep (ii), and
        (iv) storing, in the table, correction data correlating the actual dispensing rate with the input calibrating signal.

4. The method of claim 3, further comprising the steps of:
    determining from a plurality of measured dispensing rates a maximum possible flow rate from the dispensing device, and generating a maximum flow rate signal in response to the determination.

5. The method of claim 2 wherein the discrete input calibrating signal generating step includes the step of establishing the discrete input calibrating signals to evenly incremented values over the expected range of values of the input signal.

6. The method of claim 1 further comprising the steps of:
(5) producing the fluid flow measurement by:
measuring fluid dispensed in step (2) from the device onto the workpiece;
comparing the measured dispensed fluid to a reference value and producing the fluid flow measurement as a function of a result of the comparison; and
(6) repeating step (2).

7. The method of claim 1 further comprising the step of:
generating the input signal to vary in direct relation to the non-zero speed of the dispensing device relative to the workpiece while the fluid is being dispensed;
whereby the dispensing device is operated to dispense fluid in direct relation to the speed of the dispensing device relative to the workpiece.

8. The method of claim 1 further comprising the step of:
interpolating an intermediate input calibrating signal having a value between two input calibrating signals;
calculating interpolated correction data corresponding to the intermediate calibrating signal.

9. The method of claim 8, wherein the interpolating step includes the step of linearly interpolating the input calibrating signal.

10. The method of claim 1 further comprising the steps of:
performing steps (1) to (4) of the method first to dispense fluid material onto a first workpiece;
measuring fluid material dispensed onto the first workpiece;
comparing the measured total flow with a total material setting to generate thereby the compensated signal; and then
performing the steps (1) to (4) of the method to dispense fluid material onto a second workpiece.

11. A method of compensating for flow characteristics of a fluid being dispensed from a device onto a workpiece, the method comprising the steps of:
receiving an input signal;
modifying and correcting the received input signal to reduce flow non-linearities introduced by the flow characteristics from the device and to compensate for viscosity changes of the fluid by:
modifying the input signal as a function of a fluid flow measurement to produce a compensated signal; and
correcting the compensated signal as a function of the flow characteristics of the fluid through the device to produce a linearized compensated signal; and
dispensing fluid onto a workpiece under the control of the linearized compensated signal.

12. The method of claim 11 further comprising the steps of:
generating the input signal by generating a tool speed signal correlated to relative motion between the device and the workpiece;
the input signal modifying step including the step of adjusting the tool speed signal as a function of the viscosity changes of the fluid to produce the compensated signal; and
the correcting step including the step of altering the compensated signal as a function of the flow characteristics of the fluid to produce the linearized compensated signal.

13. The method of claim 12 wherein the input signal modifying step further comprises the steps of:
producing a feedback signal correlated to actual flow rate of the fluid; and
producing the compensated signal by adjusting the tool speed signal in inverse relation to the feedback signal to compensate for effects of viscosity changes of the fluid.

14. The method of claim 11 wherein the compensated signal correcting step includes the steps of:
selecting flow linearizing correction data based on a measured flow of fluid from the nozzle as a function of the input signal; and
correcting the compensated signal by the linearizing correction data to produce the linearized compensated signal.

15. The method of claim 14 wherein the input signal modifying step includes the steps of:
measuring a first amount of material dispensed from the device onto a first workpiece and producing a material measurement;
calculating a compensation factor from a difference between the first material measurement and a reference material setting; and
multiplying the input signal by the compensation factor to produce the compensated signal.

* * * * *